(12) United States Patent
Schmitt

(10) Patent No.: US 6,459,695 B1
(45) Date of Patent: Oct. 1, 2002

(54) SYSTEM AND METHOD FOR DETERMINING RADIO FREQUENCY COVERAGE TROUBLE SPOTS IN A WIRELESS COMMUNICATION SYSTEM

(75) Inventor: Jeffrey Hugh Schmitt, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/255,121

(22) Filed: Feb. 22, 1999

(51) Int. Cl.[7] ............................................. H04B 7/208
(52) U.S. Cl. ...................................... 370/344; 455/423
(58) Field of Search ................................. 370/344, 328, 370/329, 330, 331; 455/422, 423

(56) References Cited

U.S. PATENT DOCUMENTS

| | | | | |
|---|---|---|---|---|
| 5,973,643 A | * | 10/1999 | Hawkes et al. ............. | 342/457 |
| 6,119,011 A | * | 9/2000 | Borst et al. ................. | 455/452 |
| 6,205,128 B1 | * | 3/2001 | Le .............................. | 370/331 |
| 6,212,174 B1 | * | 4/2001 | Lomp et al. ................ | 370/335 |
| 6,236,365 B1 | * | 5/2001 | LeBlanc et al. ............ | 342/457 |
| 6,246,861 B1 | * | 6/2001 | Messier et al. ............. | 455/456 |
| 6,266,514 B1 | * | 7/2001 | O'Donnell .................. | 455/456 |
| 6,308,071 B1 | * | 10/2001 | Kalev ......................... | 455/446 |
| 6,317,604 B1 | * | 11/2001 | Kovach, Jr. et al. ........ | 455/456 |
| 6,321,083 B1 | * | 11/2001 | Vaara et al. ................. | 455/422 |
| 6,321,090 B1 | * | 11/2001 | Soliman ..................... | 455/440 |
| 6,324,406 B1 | * | 11/2001 | Zadeh ......................... | 455/456 |
| 2001/0007552 A1 | * | 7/2001 | Schiff et al. ................ | 370/331 |
| 2001/0016490 A1 | * | 8/2001 | Martin-Leon et al. ...... | 455/424 |

* cited by examiner

*Primary Examiner*—Hassan Kizou
*Assistant Examiner*—Lu Yin
(74) *Attorney, Agent, or Firm*—Werner Ulrich

(57) ABSTRACT

A method that rapidly and precisely determines the geographical location of areas of high concentration of usage (hot spots) and areas of poor RF frequency reception (dead spots) by measuring the number of failed call attempts, dropped calls and the like and comparing them to the identification of a mobile station and its location are recorded as record at selected points during a call. If a high number of uncompleted calls or dropped calls are recorded, then the base station can use the last known location of the wireless units involved to circumscribe an area in which the hot spot or dead spot occurs.

11 Claims, 3 Drawing Sheets

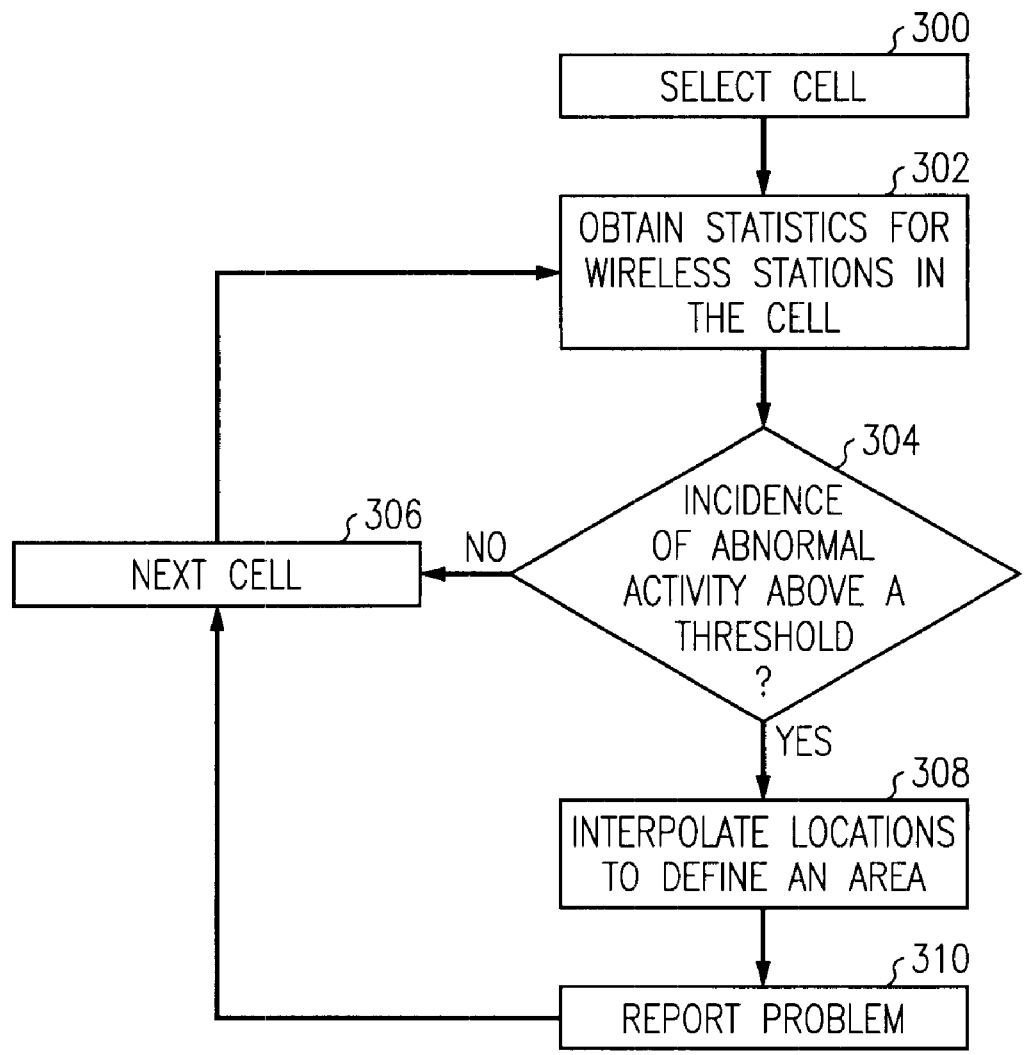

SYSTEM AND METHOD FOR DETERMINING RADIO FREQUENCY COVERAGE TROUBLE SPOTS IN A WIRELESS COMMUNICATION SYSTEM

FIELD OF THE INVENTION

This invention relates to the area of wireless telecommunications networks and, more specifically, to a tool for determining radio frequency coverage trouble spots in cells in a wireless network.

BACKGROUND OF THE INVENTION

All wireless telecommunications service providers attempt to maximize usage of their networks, provide uninterrupted service for all network users and keep the cost of providing these services to a minimum. There are many tradeoffs involved between the first two goals when compared to the third. One aspect of wireless communications where the tension between these goals may be seen is in radio frequency coverage trouble spots within cells in the wireless network.

The geographic region served by a wireless network is divided into a plurality of areas known as "cells". Each cell includes a base station to provide a radio frequency (RF) connection between the public switched telephone network (PSTN) and wireless stations in the cell. When the geographic region is first divided into cells, the cells are engineered to provide coverage for the anticipated wireless station usage. Further, the cell is engineered to take into account topological aspects of its sub-region, such as tall buildings, highway traffic and geological formations such as mountains.

Only when the wireless network is placed into service is the accuracy of the engineering assumptions tested. There may be areas of high usage in the cell that were not anticipated at the time the cell was engineered. Further, there may be dead spots that were unanticipated. The service provider receives complaints regarding inability to place calls (in congested areas) and cutoffs or no response from the wireless system (in the dead spots). The service provider then must send out a specially equipped truck (or several trucks) to determine the location and extent of the problems. In most cases, the service provider adds repeaters or supplemental "micro" or "pico" cells to provide coverage in the hot and dead spots. In many cases, however, additional micro cells to alleviate congestion are frequently over engineered and one (or more) of the micro cells end up lightly loaded. The service provider has thus unnecessarily increased cost while providing modestly improved service.

Therefore, a problem in the art is that RF coverage problems within a cell are determined through expensive effort and still may be insufficient or overly sufficient.

SUMMARY OF THE INVENTION

This problem is solved in technical advances achieved in the art by a system and method that rapidly and precisely determines the geographical area of high concentration of usage (hot spots), areas of poor RF frequency reception (dead spots), and areas of handoff thrashing. The number of failed call attempts, dropped calls land the like, are measured. The identification of a wireless station and its location are recorded at selected points during a call. If a high number of uncompleted, dropped or handed off calls are recorded, then the base station uses the last known location of the wireless stations that report trouble to circumscribe an area in which the hot spot or dead spot occurs.

BRIEF DESCRIPTION OF THE DRAWINGS

A more complete understanding of the invention may be obtained from consideration of the following description in conjunction with the drawings in which:

FIG. 3 is a flowchart of operation according to an exemplary embodiment of this invention.

DETAILED DESCRIPTION OF THE INVENTION

Figure 1:
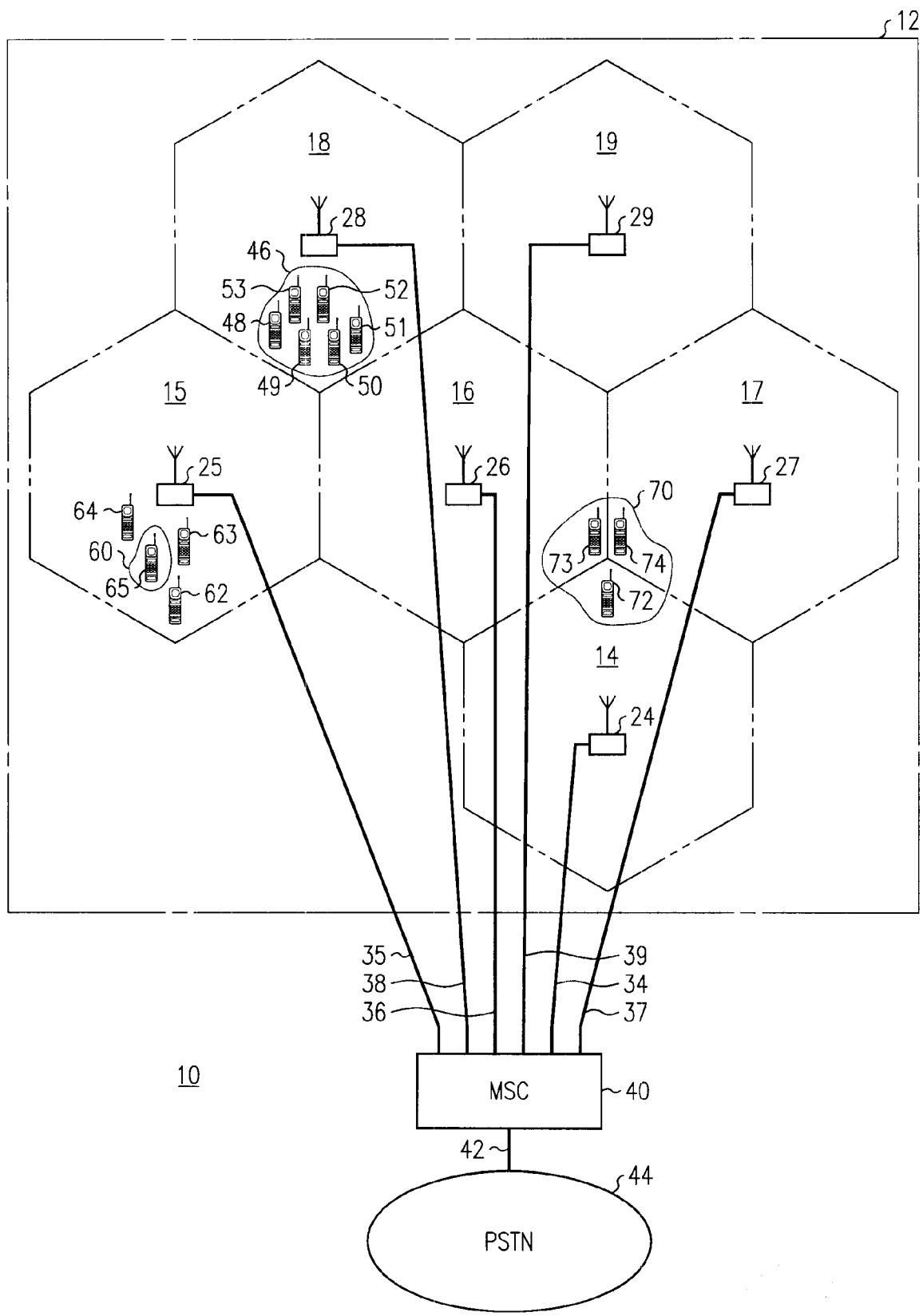
FIG. 1 is a block diagram of a wireless communication network, illustrating geographical areas of high usage and low RF reception.

FIG. 1 illustrates a wireless communications network shown generally at 10, in which an exemplary embodiment of a tool according to this invention may locate radio frequency coverage trouble areas. Wireless network 10 supplies wireless communications within a defined geographical region 12. Geographical region 12 is subdivided into cells 14, 15, 16, 17, 18 and 19, each of which define a subregion in which radio frequency communication is supported by a single base station 24, 25, 26, 27, 28 and 29 (respectively), which provides the RF connection between wireless stations in cells 14–19 and wireless network 10. Speech and/or data received via the RF link is delivered from base stations 24–29 through trunks 34, 35, 36, 37, 38 and 39 (respectively) to mobile switching center (MSC) 40. MSC 40 controls and coordinates communications between base stations 24–29 in their respective cells 14–19 and wireless stations within those cells. MSC 40 also is connected via trunks 42 to the public switched telephone network 44. Of course, wireless network 10 in practice includes many more cells, base stations and may include multiple MSCs. Further, there may be intermediate nodes between base stations 24–29 and MSC 40.

For purposes of describing this exemplary embodiment of this invention, area 46 in cell 18 has a very high call volume represented by wireless stations 48, 49, 50, 51, 52 and 53. Area 46 may include, for example, a busy intersection or airport where wireless telephone use is high.

Conversely, area 60 in cell 15 is a "hole" or an area of poor RF reception. In this case, when a wireless station is in or near hole 60, such as wireless stations 62, 63, 64 and 65, they have very poor RF communication or lose the RF connection with base station 35 entirely. A hole such as hole 60 may form in a geographical depression, an area where there are many tall buildings or similar known instances of RF interference.

MSC 40 maintains a record of performance characteristics of each of the cell sites 24–29. Such performance characteristics include number of dropped cails, number of call attempts, number of originations, etc. Further, MSC 40 associates the identification of wireless stations with the performance characteristics (i.e., originating idle dropped terminating). Thus, MSC 40 can coordinate the origination drop etc. statistics with individual wireless terminals.

One emerging technology is determining the location of a wireless station (in fact the Federal Communications Commission has mandated that by October, 2001, cellular and PCS carriers must be able to locate a mobile phone that is calling for emergency assistance within 125 meters). Such location information may be determined by combining a global positioning system in the wireless station, by triangulation among base stations or by using the information in the signals themselves to determine the location of the wireless station. This location information, when available, is currently associated with the identification of the wireless station, so that, in the case of an emergency, the wireless station may be located quickly.

According to this invention, by combining the performance; characteristics of wireless stations with their respective locations, a determination as to the need for supplemental base stations may be readily and rapidly determined. For example, in an area of congestion such as 46, cell site 28 reports all originations and, in addition, all blockage due to lack of resources. Additionally, MSC has information regarding the call attempts including identification of the wireless station and its location. Therefore, MSC can determine an area within cell 18 where the "hot spot" is located. The hot spot mapped out or a perimeter drawn around a statistical center of the high usage area. In this manner, statistical abnormalities may be eliminated and excess equipment will not be deployed where it is not needed.

Likewise, hole 60 may be determined by the last known locations of wireless stations 62, 63, 64, and 65 if they move into the hole, the MSC will have a location of the dropped call that can be connected with the dropped call. Taken over time, these statistics will show where the "hole" is located and thus a micro or pico cell may be deployed.

Area 70 is on the approximate borders of three cells, 14, 16 and 17. If, for example, wireless stations 72, 74 and 76 are moving through the area, or conversely, objects such as trucks which reflect or disrupt wireless communication RF signals pass by, the wireless stations 72, 74 and 76 will be handed off among base stations 24, 26 and 27 quite rapidly. By tracking such handoffs, a location of handoff churning such as described above in area 70 may be detected and a repeater or micro cell added that prevents such churning and thus save system resources.

Figure 2:
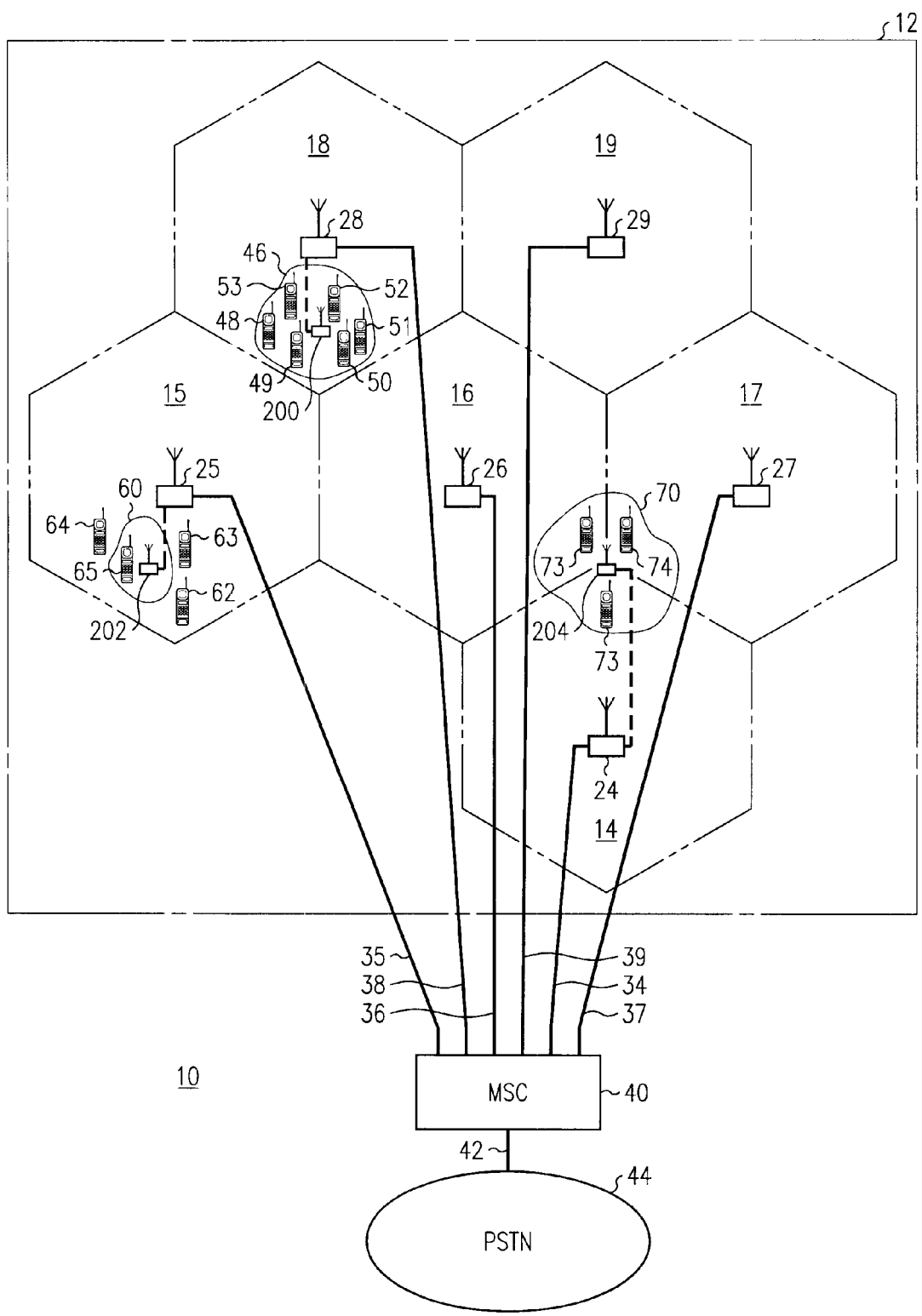
FIG. 2 is a block diagram of a wireless communications network illustrating the operation of an exemplary embodiment of this invention.

FIG. 2 illustrates wireless network 10 after corrective action is taken. Hot spot 46 is now served by a satellite basestation 200. Satellite basestation 200 may serve part or all of hot spot 46, depending on traffic patterns. The relative coverage areas of basestation 28 and satellite basestation 200 may be fine tuned using traffic patterns derived according to the teachings of this invention. In this manner, wireless stations 48–53 now all receive service, while the operating company could pinpoint the trouble spot without large expenditures of time and money.

Likewise, satellite basestation 202 serves deadspot 60. All wireless stations 62–65 receive service from either basestation 25 or 202. Satellite basestation 204 may relieve handoff thrashing. When a wireless station such as 72–74 enters the service area 70 of satellite basestation 204, it is handed over once, and then not handed over again until the wireless station 72–74 is clearly in one of the surrounding cells 14, 16 or 47.

Turning now to FIG. 3, a flowchart of processing according to one aspect of this invention is shown. Processing starts in box 300 where a cell is selected for measurement and moves to box 302, where a determination is made on the number of calls that have been dropped (or attempted or handed off) by the base station within a predetermined time. By determining the number of calls dropped over a time period, prevents statistical abnormalities from triggering corrective action. Processing moves to decision diamond 304 where the number is compared to a threshold. If the number is below the threshold, processing proceeds to box 306 where the next cell is selected. In decision diamond 304, if the number is above the threshold, then it is possible a hole has been identified in the area. Processing moves to box 308, where an approximate location of each wireless station is determined when the call was dropped and is interpolated into a boundary of a region of a dead zone (or hot spot) within a cell. The system can then forward this information to a maintenance center or conversely a program according to this invention may be run manually or automatically from the MSC when trouble reports have been made in box 310. Processing continues to box 306 where the next cell is selected.

It is to be understood that the above-described embodiment is merely an illustrative principle of the invention, and that many variations may be devised by those skilled in the art without departing from the scope of this invention. It is, therefore, intended that such variations be included within the scope of the claims.

What is claimed is:

1. A method for identifying a region within a geographic coverage are of a base station in a wireless network where the base station's radio frequency (RF) signal is insufficient to sustain calls between wireless stations and the base station, said method comprising the steps of:

determining a number of calls that have been dropped by the base station within a pre-determined time;

comparing the number to a threshold;

identifying the wireless stations whose calls have been dropped;

determining an approximate location of each wireless station when its call was dropped; and interpolating the locations of each of the wireless stations whose calls have been dropped in said region to define a boundary of said region.

2. A method in accordance with claim 1 wherein the base station maintains call statistics and wherein the step of determining comprises examining the call statistics for the number of dropped calls.

3. A method in accordance with claim 1, wherein the base station maintains all statistics and wherein the step of identifying comprises obtaining the dropped wireless stations, identification numbers from the call statistics.

4. A method in accordance with claim 1, wherein each mobile station registers with the base station when it is in the base station's coverage area, wherein each wireless station sends its identification and location as part of the registration, and wherein the step of identifying comprises determining which ones of the registered wireless stations were dropped.

5. A method in accordance with claim 1 wherein each mobile station sends its identification and location whenever it changes state, and wherein the step of determining the approximate location comprises using the last received location.

6. A method in accordance with claim 1 wherein each mobile station sends its location periodically and wherein the step of determining the approximate location comprises using the last received location.

7. A method for identifying a region of high call volume within a geographic coverage area of a base station in a wireless network between wireless stations and the base station, said method comprising the steps of:

determining a number of attempted call originations with a pre-determined time;

comparing the number to a threshold;

identifying the wireless stations attempting originations during the pre-determined time responsive to the number being greater than the threshold;

determining an approximate location of each wireless station when call origination was attempted; and interpolating the locations of each of the wireless stations who attempted origination in said region, to define a boundary of said region.

8. A method in accordance with claim 7, wherein the base station maintains call statistics and wherein the step of determining comprises examining the call statistics for the number of attempted call originations.

9. A method in accordance with claim 7, wherein the base station maintains call statistics and wherein the step of identifying comprises obtaining the identification number of each wireless station that attempted a call from the call statistics.

10. A method in accordance with claim 7, wherein each wireless station registers with the base station when it is in the base station's coverage area, wherein each mobile station sends its identification and location as part of the registration, and wherein the step of identifying comprises determining which ones of the registered mobile stations attempted call originations.

11. A method in accordance with claim 7, wherein each wireless station sends its identification and location whenever it attempts to originate a call, and wherein the step of determining the approximate location comprises using the attempted call origination location.

* * * * *